Jan. 10, 1956  A. HALTMEIER  2,730,431
MANUFACTURE OF SULFURIC ACID
Filed May 24, 1950
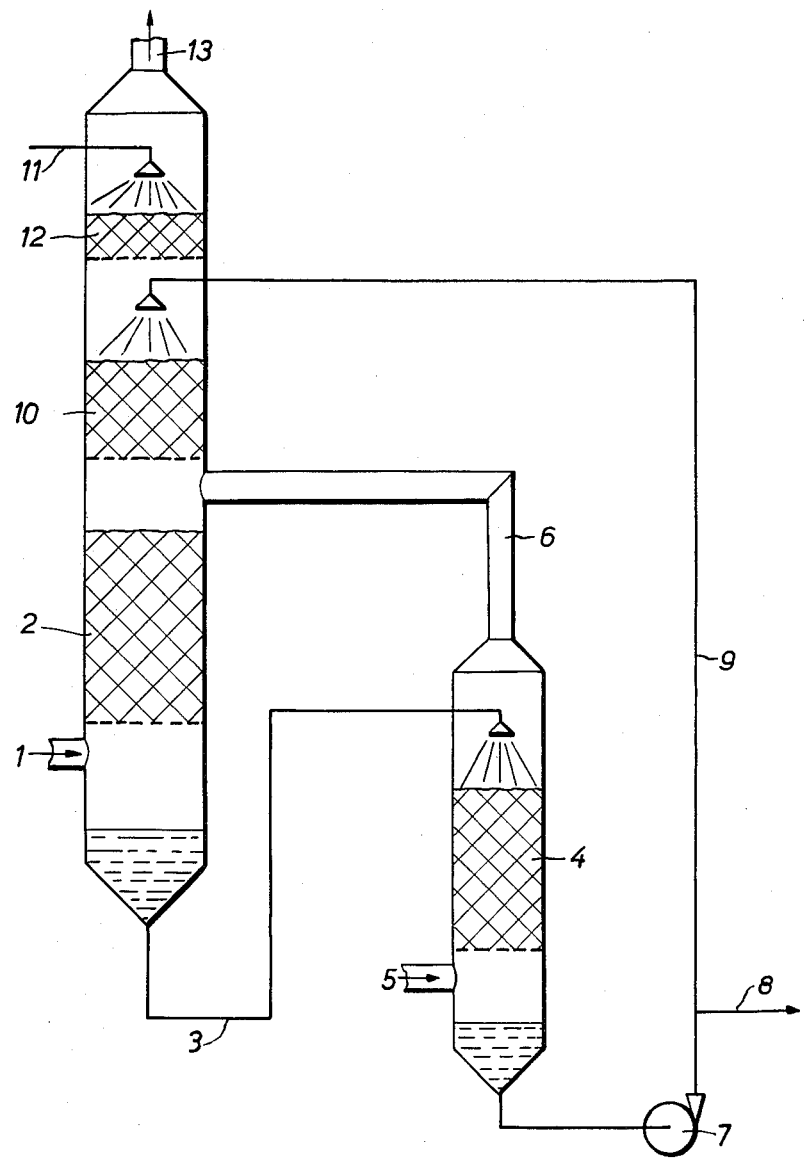
INVENTOR.
ALFRED HALTMEIER
BY
Connolly and Hutz
ATTORNEY

2,730,431

MANUFACTURE OF SULFURIC ACID

Alfred Haltmeier, Leverkusen-Bayerwerk, Germany, assignor to Farbenfabriken Bayer Aktiengesellschaft, Leverkusen, Germany, a corporation of Germany Application May 24, 1950, Serial No. 163,817

Claims priority, application Germany June 8, 1949

5 Claims. (Cl. 23—167)

This invention relates to a process for the manufacture of sulfuric acid, and more particularly to a process for the manufacture of sulfuric acid by reacting sulfur trioxide with sulfuric acid at temperatures of at least 150° C. and of at most the boiling point of the sulfuric acid. The sulfur trioxide is used in the form of gases containing it. The sulfuric acid is contacted with the gases containing sulfur trioxide and absorbs the sulfur trioxide from the gases. Preferably sulfuric acid is used containing water. Obviously it is not necessary to start with pure sulfuric acid; when starting with water or an aqueous liquid, sulfuric acid is formed according to the equation:

$$H_2O + SO_3 = H_2SO_4$$

The heat evolved in this reaction is not or not completely removed, so that after a short time the sulfuric acid reaches a temperature of at least 150° C. At this temperature and at higher temperatures sulfuric acid containing water absorbs sulfur trioxide from the gases more completely than at lower temperatures. Experiments have shown absorption of sulfur trioxide to be more complete the higher the temperature of the aqueous absorbent. Preferably the sulfuric acid should reach vaporizing temperatures. The vaporizing temperatures of the sulfuric acid used depend on the water content of the acid and on the dilution of the gases containing sulfur trioxide. When using vaporizing sufuric acid as the washing medium for the gases containing sulfur trioxide, only sulfur trioxide is absorbed from the gases, while other substances present in these gases, such as water vapor and sulfur dioxide are not absorbed. Furthermore, vaporizing sulfuric acid containing water gives off water vapor whereby a concentration of the acid occurs. The saving of cooling water, when the water supply is scarce, may sometimes be more important than the decrease of sulfur trioxide losses occurring in the waste gas. If the content of water vapor in the gases is higher than the amount of sulfur trioxide present, as may be the case with gases obtained in a hydrogen sulfide combustion apparatus, it is not possible to obtain a higher concentration of acid, because the content of water vapor in the gases is absorbed by the sulfuric acid, which sulfuric acid is diluted by the water absorbed from the gases. This is the case when processing according to the hitherto customary absorption processes where working is effected at low temperatures or by cooling the gases. When working according to the customary processes, not only water vapor but also other constituents of the gases are absorbed by the sulfuric acid, for instance, sulfur dioxide. However, sulfuric acid containing sulfur dioxide cannot be applied in all instances.

For cooling the hot sulfuric acid after absorbing sulfur trioxide from the gases, air is used which, after having been charged with heat and acid vapors coming from the vaporizing sulfuric acid, is contacted with water or sulfuric acid, for instance waste acid, whereby heat and material exchange occurs. By absorbing the acid vapors and the heat a heated sulfuric acid is formed, which may be utilized for washing the gases containing sulfur trioxide.

A substantial commercial advantage is that the equipment to be used for carrying out the process of the invention does not require any heat exchanging surfaces and that all parts of the apparatus coming in contact with the acid can be made of, for instance, ceramic material resistant to corrosion.

The accompanying drawing provides a detailed illustration of the process of the invention diagrammatically.

The gases containing sulfur trioxide, for instance the gases consisting of 1 mol of sulfur trioxide, 0.05 mol of sulfur dioxide, 2.5 mols of water and 15 mols of inert gases enter the absorber 2 at 1 and are washed in the absorber with a vaporizing sulfuric acid consisting of, for instance 4 mols of sulfuric acid and 4 mols of water. The acid consisting of 5 mols of sulfuric acid and 1.5 mols of water running off after washing has been effected, flows through pipe 3 into the cooler 4 at a temperature of, f. i. 260° C., where it is cooled by means of air. The cold air, consisting of for instance 22 mols of nitrogen, 6 mols of oxygen, and 0.5 mol of water vapor, enters at 5 at a temperature of 20° C. and, after absorbing heat and acid vapors, the gas now consisting of 22 mols of nitrogen, 6 mols of oxygen, 1.5 mols of water, 0.6 mol of sulfuric acid vapor at a temperature of 200° C. is added through pipe 6 to the waste gases coming from the absorber 2, the waste gases consisting of 15 mols of inert gases, 4 mols of water vapor, 0.05 mol of sulfur dioxide and traces of sulfuric acid and sulfur trioxide and having a temperature of 175° C. The acid running off from cooler 4 has a temperature of 50° C. and consists of 4.4 mols of sulfuric acid and 0.5 mol of water. It is removed from the cooler through pump 7. One portion of this acid, for instance, 2.2 mols of sulfuric acid and 0.25 mol of water can be taken out through pipe 8 as a product of manufacture. Another portion consisting of 0.22 mol of sulfuric acid and 0.25 mol of water flows into the heat and material exchanger 10 through pipe 9. In the heat and material exchanger it takes up heat and acid vapors from the waste gases of the absorber 2 and the cooler 4. In the present example these waste gases consist of a total of 43 mols of inert gases, 5.5 mols of water vapor, 0.6 mol of sulfuric acid vapor, 0.05 mol of sulfur dioxide and traces of sulfur trioxide and have a temperature of 190° C. The acid entering the heat and material exchanger 10 consists of 3.4 mols of sulfuric acid and 4 mols of water. The acid leaving the exchanger 10, serving thereupon as washing liquid in the absorber 2, consists of 4 mols of sulfuric acid and 4 mols of water. The water necessary for the binding of the sulfur trioxide must be introduced into the acid cycle at some place. In the present example it is to be introduced in the form of dilute waste acid containing 1.2 mols of sulfuric acid and 5 mols of water at 20° C. at 11, whereby in the exchanger 12 it effects a second washing of the waste gases before these waste gases leave through pipe 13 at, for instance, 80° C. The waste gases consist of 43 mols of inert gases, 6.75 mols of water vapor and 0.05 mol of sulfur dioxide.

Gases may be dried by washing with sulfuric acid, whereby the dilution of the sulfuric acid caused by the absorption of water is adjusted by the addition of sulfur trioxide. The said process, when used for instance for drying gases from roasting, shows the disadvantage that the quantity of sulfur trioxide required must be relatively large. For instance, it may be assumed that from 1000 cubic meters of gas from roasting 20 kg. of water vapor are to be removed. In that case for the formation of sulfuric acid containing, for instance, 0.5 mol of water, sulfuric acid (0.5), a quantity of sulfur trioxide of 20.80/27=59.3 kg. is necessary.

According to one feature of the invention the amount of sulfur trioxide required for drying can be greatly reduced if the heat evolved by absorption is used for the evaporation of the water that is absorbed from the gas to be dried. In that case the concentration of the acid is not effected by absorption of the sulfur trioxide alone but also by the evaporation of the water.

The acid heated by the absorption of sulfur trioxide is preferably cooled with air. For utilizing the heat, the air with the acid diluted by absorption of the water from the gas to be dried, may be brought into heat and material exchange. Acid vapors eventually carried along with the air are absorbed in the diluted acid.

Since fresh air from the outside always contains water vapor, the absorption of which in the acid reduces the cooling action of the air and besides effects an undesired dilution of the acid, it is of advantage to use the same air several times, that is, to effect circulation of this air between the concentrated and the diluted acid.

Another advantage is the possibility of combining with the drying a heating of the gases in the simplest manner. When using sulfuric acid in relatively high concentrations, the gas can be considerably heated, for instance to 120° C., by means of the acid used for drying without the drying action of the acid being reduced to a remarkable extent.

By this heating the value of the dried gases is increased. When using the gases for drying other products, their absorptive power for moisture is multiplied by the temperature rise. If gases from roasting are dried, which are further worked up according to the contact process, the operation of the contact kilns is facilitated and the formation of noxious mist avoided.

A higher temperature of the acid used for drying is easily obtained, when the vaporizing acid coming from the absorption of sulfur trioxide, which is subsequently cooled with air, is somewhat less cooled. On the other hand, in this case the acid flowing back from the drying apparatus to the absorption apparatus may be heated less.

For illustrating the new process according to the above example, it may be assumed that a sulfuric acid containing 0.5 mol of water is available for drying purposes. This acid is diluted to a content of 2 mols of water by absorption of water vapor from the gas to be dried. By absorption of sulfur trioxide the initial concentration of the acid is to be restored.

Corresponding to the change of concentration $$H_2SO_4 \ (0.5) + 1.5H_2O \ (g) \rightarrow H_2SO_4 \ (2)$$

by inserting the heats of formation

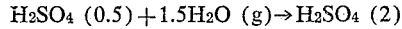

an excess of heat of 21.864 kg. cal. is obtained.

On reconcentration of the acid by evaporation of water the same amount of heat is to be introduced. In accordance with the invention the heat evolved by the absorption of sulfur trioxide is used for this purpose.

$$H_2SO_4 \ (2) + SO_3 \ (g) \rightarrow 2H_2SO_4 \ (0.5) \ 203.51 +$$
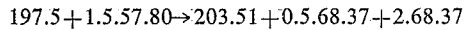

Accordingly the heat of absorption of 1 mol of sulfur trioxide (g) amounts to 29.22 kg. cal. At an evaporation temperature of the acid of about 200° C. the enthalpy of the water vapor formed is larger by about $8.4.10^3$ (200—18) =1.53 kg. cal. per mole than with the initial temperature of 18° C. inserted for the heats of formation applied in this case, so that with the amount of heat obtained from the absorption of sulfur trioxide 1.5.29.22 (21.864+1.5.1.53) =1.82 mols of steam are evaporated from the diluted acid. The heat required for heating the acid to the evaporation temperature may be recovered according to the invention by circulating air. It therefore need not be considered in the calculation.

In the present example according to the hitherto customary processes 20.90/27=59.3 kg. of sulfur trioxide are required for removing 20 kg. of steam from 1000 cubic meters of gas, whereby the acid required for drying is diluted to a water content of from 0.5 to 2 mols. According to the new process the heat generated by absorption is used for evaporation of 1.82 mols of the water absorbed from the gas to be dried, whereby the quantity of sulfur trioxide needed is reduced to 59.3.1.5/(1.5+1.82)=26.8 kg.

Water or liquids containing water (brine) may be cooled or frozen by partial evaporation under low pressure, whereby the water vapor formed is absorbed by means of sulfuric acid. The dilution of the sulfuric acid occurring in the absorption of water may be adjusted by adding sulfur trioxide.

The said process has the disadvantage that a relatively large quantity of sulfur trioxide is required, as will be seen from the following example:

| | |
|---|---|
| Production of ice_____kg__ | 1 |
| Quantity of cold required _____kg. cal__ | 100 |
| Amount of water to be evaporated_____kg__ | 0.17 |
| Amount of SO₃ required for the formation of H₂SO₄ (0.5)_____kg__ | 0.5 |

According to another feature of the present invention the consumption of sulfur trioxide may be considerably decreased by applying the heat formed during the absorption of sulfur trioxide for evaporating the water absorbed at low pressure.

In that case it is advantageous to cool the acid which is heated by absorption of sulfur trioxide by means of air. The heat may be utilized, when contacting this air with the acid diluted by means of water with heat and material exchange. Acid vapors carried along with the air are absorbed by the diluted acid. Since the fresh air from the outside always contains water vapor the absorption of which in the acid reduces the cooling action of the air and also effects an undesirable dilution of the acid, it is advantageous to use the same air all the time, that is, to circulate this air between the concentrated and the diluted acid.

To show the results obtained with the new process by way of example, it may be assumed that an acid containing 0.5 mol of water is available for the production of cold. This acid is diluted by absorption of water vapor at low pressure, for instance 3 torr., to a content of 2 mols of water. By absorption of sulfur trioxide the initial concentration of the acid is to be restored.

Corresponding to the change of concentration $$H_2SO_4 \ (0.5) \rightarrow H_2SO_4 \ (2)$$

the heat of the dilution is $$\Delta H = 340.25 - 334.24 = 6.01 \text{ kg. cal.}$$

Since the water used for the dilution is absorbed in the form of water vapor, the heat of vaporization of 1.5 mol of water

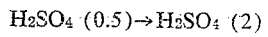

is to be added.

Accordingly a total of 21.865 kg. cal. is to be removed. For reconcentration of the acid by evaporation of water the same amount of heat is to be used. According to the invention the heat evolved by absorption of sulfur trioxide is used for that purpose.

$$H_2SO_4 \ (2) + SO_3 \ (g) \rightarrow 2H_2SO_4 \ (0.5)$$
$$340.25 + 93.9 \rightarrow 463.37$$
$$\Delta H = 463.37 - 434.15 = 29.22 \text{ kg. cal.}$$

With this amount of heat evolved by the absorption of 1 mol of sulfur trioxide (g) at the temperature of 18° C., upon which temperature the heats of formation inserted are based, an amount of acid containing $$29.22/21.865 = 1.336 \text{ mols of } H_2SO_4$$

may be concentrated from 2 to 0.5 mol of water, whereby 1.336.1.5=2.004 mols of water vapor would be formed. For removing the water vapor without pumping being necessary, evaporation must take place at the normal vaporizing temperature of the acid, that is at about 200°

C. The enthalpy of the steam at 200° C. is higher for 8.4.10⁻³.182=1.53 kg. cal./mol. than at 18° C. At a steam temperature of 200° C. with the amount of heat at disposal from the sulfur trioxide absorption $$1.5.29.22 \ (21.865+1.5.1.53)=1.82 \ mols$$

of water are evaporated from the diluted acid. The heat necessary for heating the acid to the evaporation temperature is recovered according to the invention by the circulation of air and therefore need not be considered in the calculation.

In the present example from 1 mol of sulfur trioxide 1.5 mols of water are bound to sulfuric acid (0.5) according to the hitherto used processes. According to the new process the heat of absorption of the sulfur trioxide is used for the evaporation of another 1.82 mols of water. For obtaining the same amount of cold by partial evaporation the new process in the present example requires the $(1.5+1.82)/1.5=2.21$ part of the amount of sulfur trioxide required according to the process used heretofore, that is to say, for producing 1 kg. of ice not the above mentioned 0.5 kg. of sulfur trioxide but only 0.225 kg. of sulfur trioxide are necessary.

I claim:

1. The process of manufacturing sulfuric acid which includes the steps of contacting a gas stream comprising water vapor and sulfur trioxide with a liquid stream of an aqueous sulfuric acid in an absorbing zone, the exit liquid acid from the absorbing zone being heated by said absorption to a temperature above 150° C., cooling said exit liquid acid by passing through a separate acid-cooling zone wherein the acid is cooled solely by contact with an inert gas and wherein several mols of inert gas are heated for each mol of water and acid cooled, withdrawing product acid from the acid cooled by said inert gas, recovering entrained sulfuric acid from the heated inert gas in a cleaning zone by contacting said heated inert gas with an aqueous sulfuric acid and dissipating all of the heat of the entire operation as inert gases containing water vapor without the use of a liquid functioning primarily to cool another liquid.

2. The process of claim 1 in which the acid is simultaneously cooled and concentrated in the cooling zone whereby the water vapor content of the inert gas leaving the cooling zone is greater than the water vapor content of the inert gas entering the cooling zone.

3. The process of claim 1 in which the gas stream leaving the absorbing zone and the hot inert gas leaving the cooling zone are mixed to pass together through the cleaning zone.

4. The process of claim 3 in which the liquid entering the gas exit portion of the cleaning zone is relatively dilute acid and in which a portion of the product acid stream is mixed therewith in the middle portion of the cleaning zone, and in which the liquid acid from the cleaning zone serves as the liquid entering the absorption zone.

5. The process of claim 4 in which some of the water of the dilute acid entering the cleaning zone is evaporated whereby the product acid has a small water content and whereby the water vapor content of the mixed gas stream leaving the cleaning zone is greater than the combined water vapor content of the inert gas entering the acid-cooling zone and the gas stream entering the absorbing zone.

References Cited in the file of this patent

UNITED STATES PATENTS

| 1,002,824 | Cox | Sept. 12, 1911 |
| 1,013,638 | Briggs et al. | Jan. 2, 1912 |
| 1,233,627 | Weber | July 17, 1917 |
| 1,291,306 | Weber | Jan. 14, 1919 |
| 1,845,632 | Spalding | Feb. 16, 1932 |
| 2,199,691 | Carter | May 7, 1940 |
| 2,655,431 | Allen, Jr., et al. | Oct. 13, 1953 |

OTHER REFERENCES

Miles: Manufacture of Sulfuric Acid (Contact Process), vol. IV, pages 248–253, Van Nostrand Co., New York, 1925.